(12) United States Patent
Safford

(10) Patent No.: US 7,370,232 B2
(45) Date of Patent: *May 6, 2008

(54) METHOD AND APPARATUS FOR RECOVERY FROM LOSS OF LOCK STEP

(75) Inventor: Kevin David Safford, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/454,087

(22) Filed: Jun. 16, 2006

(65) Prior Publication Data
US 2006/0248384 A1    Nov. 2, 2006

Related U.S. Application Data

(63) Continuation of application No. 10/187,833, filed on Jul. 3, 2002, now Pat. No. 7,085,959.

(51) Int. Cl.
*G06F 11/00* (2006.01)
(52) U.S. Cl. .............................. 714/11; 714/12; 714/13
(58) Field of Classification Search ................... 714/11, 714/12, 13
See application file for complete search history.

(56) References Cited

U.S. PATENT DOCUMENTS

| 4,589,066 A | 5/1986 | Lam et al. |
| 6,065,135 A | 5/2000 | Marshall et al. |
| 6,148,348 A | 11/2000 | Garnett et al. |
| 6,263,452 B1 | 7/2001 | Jewett et al. |

OTHER PUBLICATIONS

Tamir, Yuval, "Self-Checking Self-Repairing Computer Nodes Using the Mirror Processor", IEEE Journal Of Solid-State Circuits, vol. 27. No. 1, Jan. 1992.
Search Report issued on Dec. 30, 2003 in counterpart foreign application in GB under application No. 315295.6.

*Primary Examiner*—Bryce P Bonzo

(57) ABSTRACT

An apparatus, operating on an advanced multi-core processor architecture, and a corresponding method, are used to enhance recovery from loss of lock step in a multi-processor computer system. The apparatus for recovery from loss of lock step includes multiple processor units operating in the computer system, each of the processor units having at least two processor units operating in lock step, and at least one idle processor unit operating in lock step; and a controller coupled to the two processor units operating in lock step and the idle processor unit. The controller includes mechanisms for copying an architected state of each of the two lock step processor units to the idle processor unit.

20 Claims, 4 Drawing Sheets

METHOD AND APPARATUS FOR RECOVERY FROM LOSS OF LOCK STEP

CROSS REFERENCE TO RELATED APPLICATION(S)

This is a continuation of U.S. patent application Ser. No. 10/187,833, filed Jul. 3, 2002 now U.S. Pat. No. 7,085,959, which is hereby incorporated by reference in its entirety herein.

TECHNICAL FIELD

The technical field is computer systems employing lock stepped microprocessors.

BACKGROUND

Advanced computer architectures may employ multiple microprocessors. Some advanced computer architectures may employ multiple microprocessors on one silicon chip. In a typical application, two microprocessors may be implemented on a single silicon chip, and the implementation may be referred to as a dual core processor. Two or more of the multiple microprocessors may operate in a lock step mode, meaning that each of the lock stepped microprocessors process the same code sequences, and should, therefore, produce identical outputs. FIG. 1A illustrates a typical implementation of a dual core processor. A dual core processor 10 includes a silicon chip 11 having microprocessor core 12 (core 0) and microprocessor core 14 (core 1). The microprocessor cores 12 and 14 are coupled to an interface logic 16 that monitors external communications from the microprocessor cores 12 and 14. In the dual core processor 10, the microprocessor cores 12 and 14 operate as independent entities. While the dual core processor 10 has advantages in terms of size and processing speed, the reliability of the dual core processor 10 is not significantly better than that of two single core processors.

To enhance reliability, the dual core processor, or other multiple microprocessor architected computer systems, may employ lock step features. FIG. 1B is a diagram of a prior art dual core processor that uses lock step techniques to improve overall reliability. In FIG. 1B, a computer system 18 includes a dual core processor 20 having a single silicon chip 21, on which are implemented microprocessor core 22 and microprocessor core 24. To employ lock step, each of the microprocessor cores 22 and 24 process the same code streams. To ensure reliable operation of the dual core processor 20, each of the microprocessors 22 and 24 may operate in "lock step." An event that causes a loss of lock step can occur on either or both of the microprocessor cores 22 and 24. An example of such an event is a data cache error. A loss of lock step, if not promptly corrected, may cause the computer system 18 to "crash." That is, a failure of one microprocessor core may halt processing of the dual core processor 20, and the computer system I 18, even if the other microprocessor core does not encounter an error.

To detect a loss of lock step, a lock step logic 26, which may be external to the chip 21, compares outputs from the microprocessor cores 22 and 24. A difference in processing detected by the lock step logic 26 is by definition a loss of lock step. A drawback to the dual core processor architecture shown in FIG. 1B is that the logic to determine loss of lock step is external to the chip. This configuration imposes delays in determining loss of lock step, and requires additional architectural features.

The dual core processor 20 also makes recovery from a loss of lock step difficult and time-consuming. FIG. 1C illustrates a current methodology for recovering from a loss of lock step. In FIG. 1C, the dual core processor 20 is shown coupled to memory 25. Should the dual core processor 20 suffer a loss of lock step, recovery may be initiated by the memory 25 saving the architected state of one of the microprocessors 22 and 24 (i.e., the microprocessor that is considered "good"). Then, both microprocessors 22 and 24 are reset and reinitialized. Finally, the architected states of each of the microprocessors 22 and 24 is copied from the memory 25 into the microprocessors 22 and 24, respectively. This prior art methodology for recovery from a loss of lock step makes the microprocessors 22 and 24 unavailable for an amount of time. If the amount of time required for recovery is too long, the computer system 18 employing the dual core processor 20 may "crash."

SUMMARY

An apparatus, operating on an advanced multi-core processor architecture, and a corresponding method, are used to enhance recovery from loss of lock step in a computer system. In an embodiment, the apparatus for recovery from loss of lock step comprises a plurality of processor units operating in the computer system, each of the processor units comprising at least two processor units operating in lock step, and at least one idle processor unit operating in lock step; and a controller coupled to at least the at least two processor units operating in lock step and the at least one idle processor unit, the controller comprising means for copying an architected state of each of the at least two processor units to the idle processor unit.

The method comprises receiving a loss of lock step signal from a processor unit: receiving a notice from the processor unit experiencing the loss of lock step to take the processor unit off line; and moving an architected state of the processor unit experiencing the loss of lock step to a spare processor unit, wherein the spare processor unit becomes an active processor unit in the computer system.

DESCRIPTION OF THE DRAWINGS

The detailed description will refer to the following figures, in which like numbers refer to like elements, and in which.

DETAILED DESCRIPTION

Figure 1A:
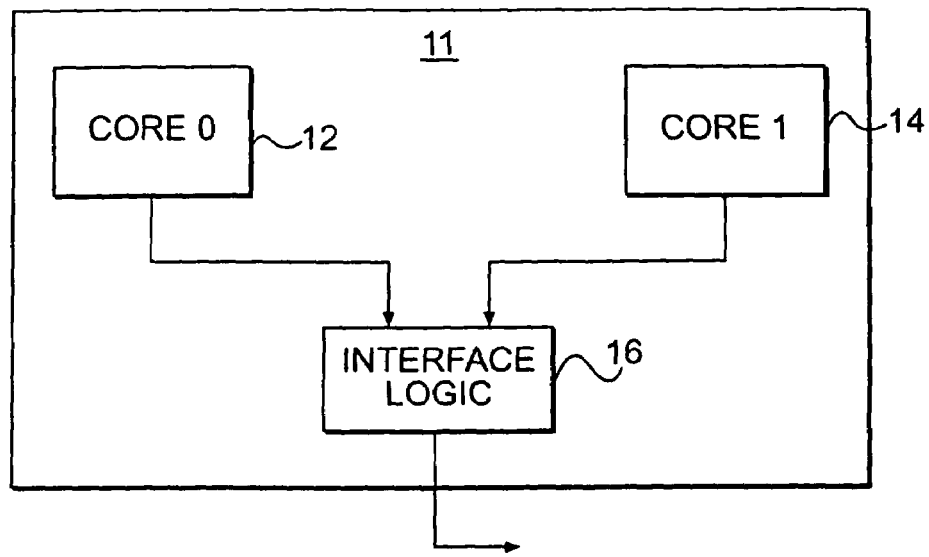
FIG. 1A is a diagram of a prior art dual-core processor.
Figure 1B:
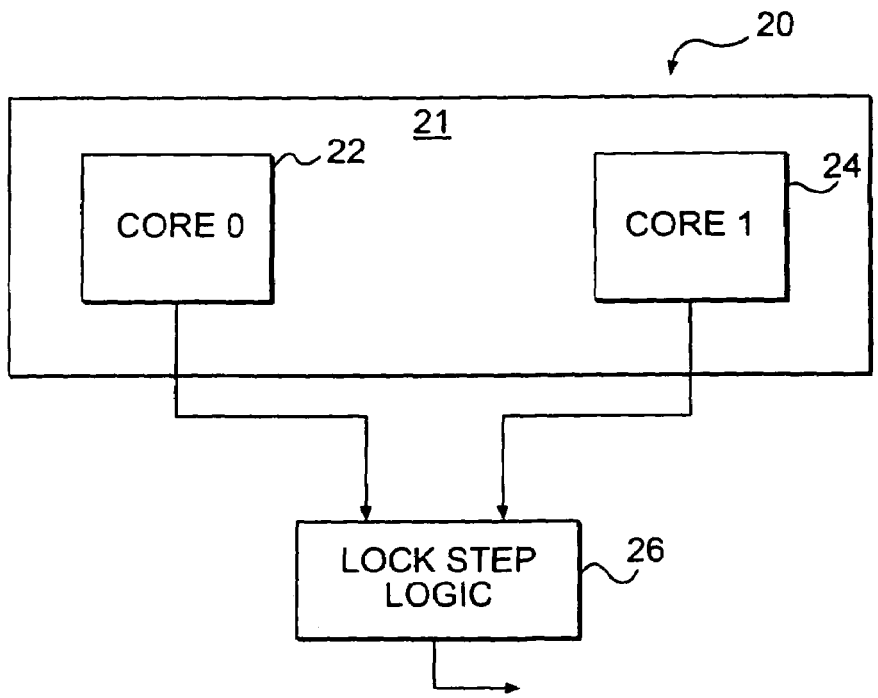
FIG. 1B is a diagram of a prior art dual-core processor employing lock step.
Figure 1C:
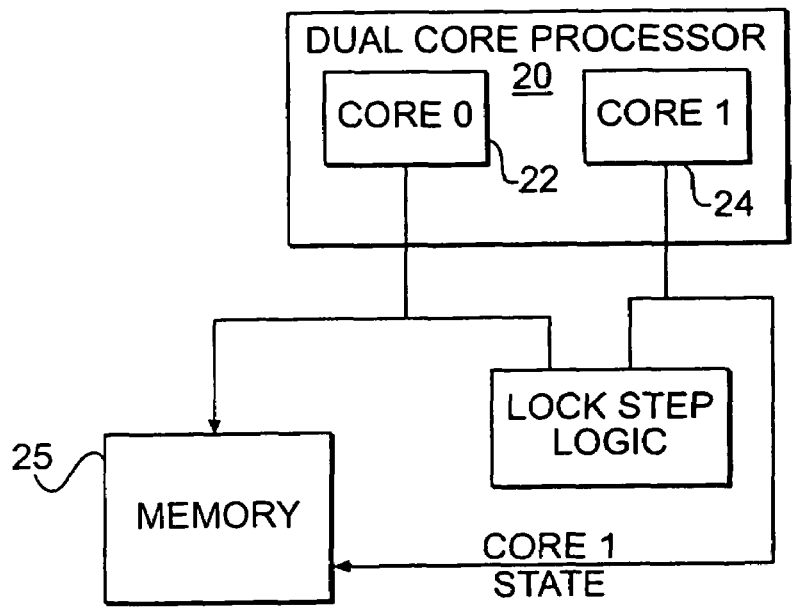
FIG. 1C is a diagram illustrating prior art recovery from loss of lock step.
Figure 2:
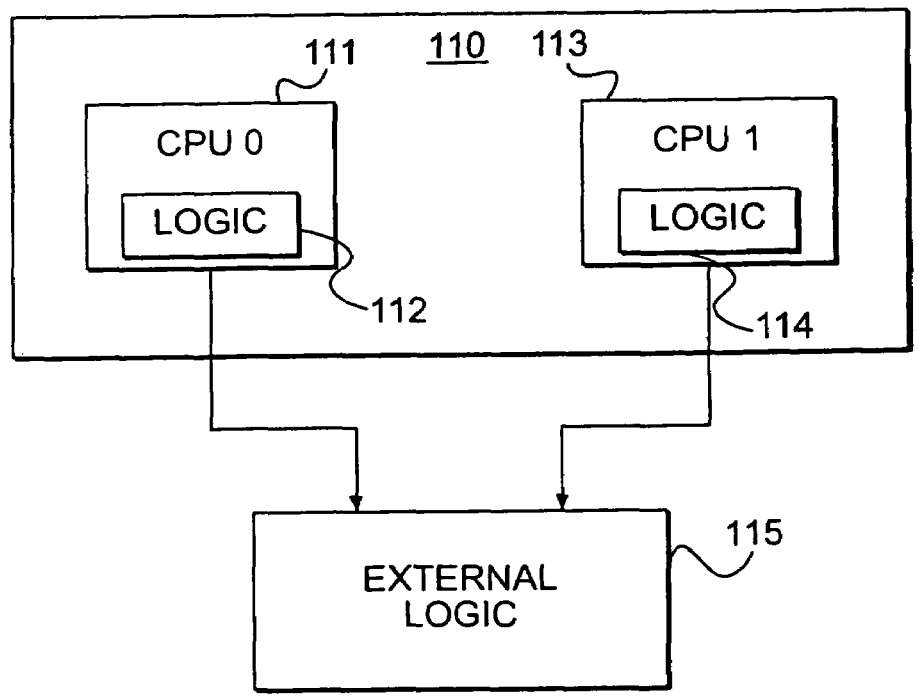
FIG. 2 is a diagram of a computer system that uses an improved, multi-core processor employing lock step processing.

To improve reliability of processing assets, a computer system employs lock stepped processor cores that operate in a master/checker pair. Each of two processors in the pair processes the same code sequences, and the resulting outputs of the processors are compared by a logic circuit located near external interfaces of the two processors. Any difference in the processor outputs indicates the existence of an error. The logic circuit may then initiate a sequence of steps that halt operation of the two processors. FIG. 2 shows a computer system 100 that employs processors 111 (central processor unit (CPU) 0) and 113 (CPU 1), which, in an embodiment, may be located on a common silicon chip or substrate 110. Alternatively, the processors 111 and 113 may be implemented on separate substrates. The processors 111 and 113 may operate in an independent mode, or in a lock step mode. When operating in a lock step mode., the processors 111 and 113 will appear to the computer system 100 to be a single processor core, or a logical CPU 0. The processor 111 may include error detection and signaling logic 112, and the processor 113 may include error detection and signaling logic 114. The error detection and signaling logic will be described later.

External logic circuit 115 monitors outputs of the processors 111 and 13 and may be used to detect any differences in the outputs. As noted above, such differences are indicative a potential error in at least one of the processors 111 and 113. However, which of the processors 111 and 113 is subject to an error condition may not be known. On rare occasions, both the processors 111 and 113 may be subject to an error condition. Such an error condition may lead to a halt in processing of the processors 111 and 113 until the error can be corrected. In other words, any difference in the outputs causes a loss of lock step, and a halt to processing.

To improve availability of the processors assets of the computer system 100, additional features, such as means for detecting and signaling occurrence of errors, may be incorporated into the computer system 100. For example, the error detection and signaling logic 112 and 114 may be included in the processors 111 and 113, respectively, or in other parts of the computer system 100, to signal an impending loss of lock step. Using the impending loss of lock step signal, the computer system 100 may continue operating (processing) using one of the processors 111 and 113 that did not experience an error. In particular, certain events within either of the lock stepped processors 111 and 113 may be used by the processors 111 and 113, respectively, to indicate the impending loss of lock step. As an example, and possibly due to completely random circumstances, a data cache error for a cache associated with the processor 111 may occur. Such an error can be completely corrected (i.e., the processor 111 does not need to be replaced), but will guarantee that the processors 111 and 113 will break lock step at some future time because the data cache error causes timing differences between the processors 111 and 113. The processor 111 may detect the data cache error, and use the detection of this data cache error to signal the logic circuit 115 that the processor 111 is experiencing an error that will cause a loss of lock step, and that the processor 111 is "bad." The logic circuit 115 may then "turn off," thereby ending lock step operations, and processing may continue using the "good" processor 113. At some future time, recovery from the loss of lock step (and correction of the data cache error) is executed to restore lock step operation of the processors 111 and 113.

Figure 3:
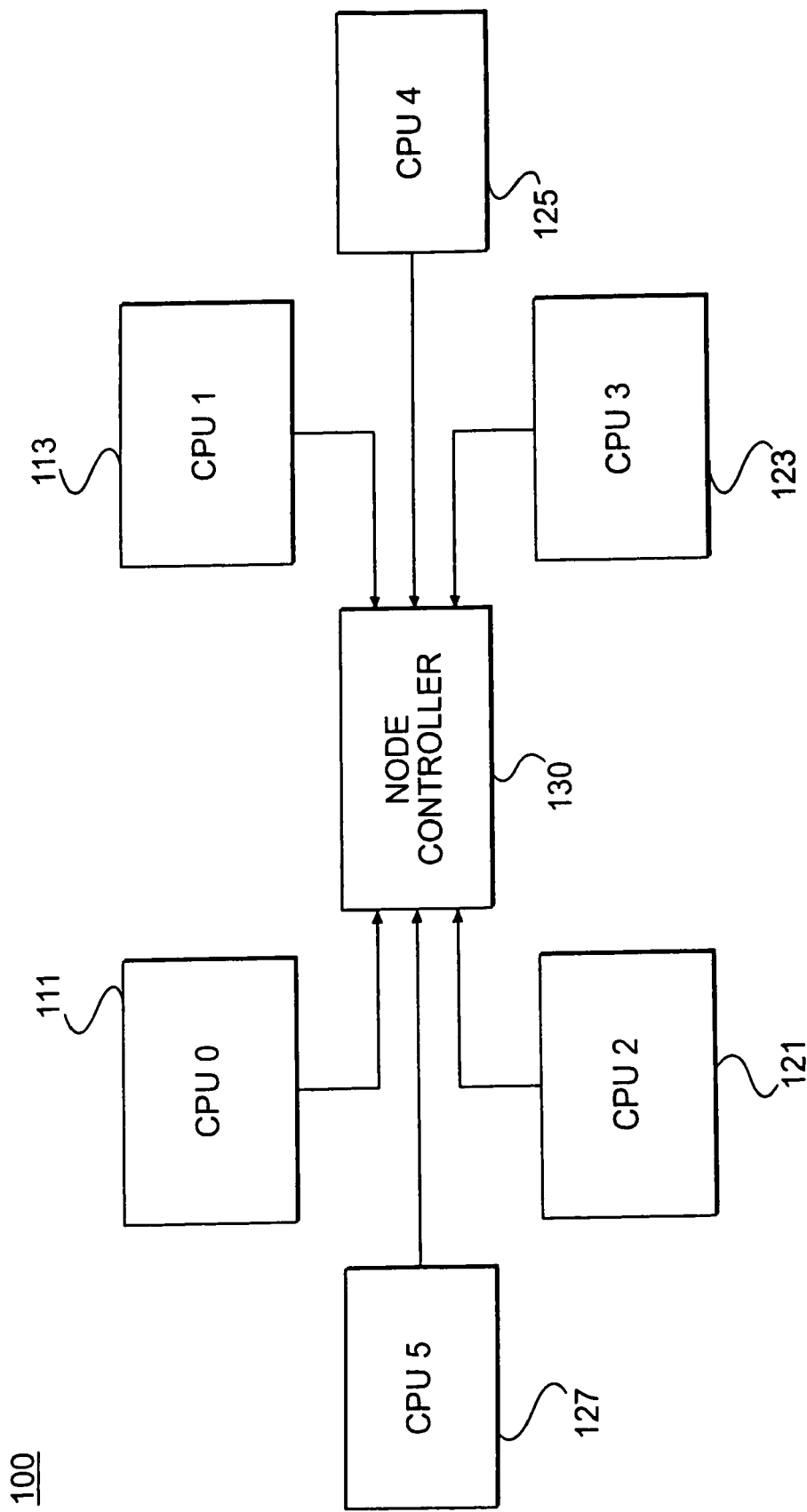
FIG. 3 illustrates additional architectural features for use in recovery from loss of lock step for the computer system of FIG. 2.

FIG. 3 illustrates further architectural details for recovery from loss of lock step in the computer system 100 of FIG. 2. In FIG. 3, the computer system 100 is shown with additional processors 121, 123, 125, and 127, as well as the processors 111 and 113. The processors 111, 113, 121, 123, 125, and 127 are coupled to node controller 130. The processors operate as pairs when in lock step (i.e., the processors 111 and 113 are a first pair; the processors 121 and 123 are a second pair; and the processors 125 and 127 are a third pair). From the node controller's perspective, each pair of processors appears as a single (logical) processor. The processor pairs, or processor units, are coupled to a lockstep logic, such as the lockstep logic 115 shown in FIG. 2, and the lockstep logic is then connected to the node controller 130. The node controller 130 provides means for copying the architected state of a processor to another processor. In an embodiment, the node controller 130 has available at all time a current architected state of the processors to which the node controller 130 is coupled. In another embodiment, the node controller 130 simply provides means for communication among the processors 111, 113, 121, 123, 125, and 127. For example, the node controller 130 may store the architected state of the processors 111, 113, 121, 123, 125, and 127, either internally in the node controller 130, or in another component of the computer system 100. Alternatively, the node controller 130 may allow one processor (e.g., the processor 111) to copy the architected state of the processor 111 to another processor (e.g., the processor 125). In yet another alternative embodiment, the node controller 130 may allow a processor that has broken lock step to copy, as part of the process for recovering from loss of lock step, the architected state of the processor to the node controller 130, which will in turn copy the architected state to a "hot standby" processor.

The six processors 111, 113, 121, 123, 125, and 127 operate in lock step (i.e., are processing code sequences). For example, the processor 111 operates in lock step with the processor 113, and the processor 121 operates in lock step with the processor 123 and the processor 125 operates in lock step with the processor 127.

The processor 125 may be designated as a "hot standby," and is sitting idle in lock step mode with the processor 127. Should one of the processors 111, 113, 121, and 123 suffer an error, the hot standby processors 125, 127 may be used to speed recovery from the resulting loss of lock step.

Figure 4:
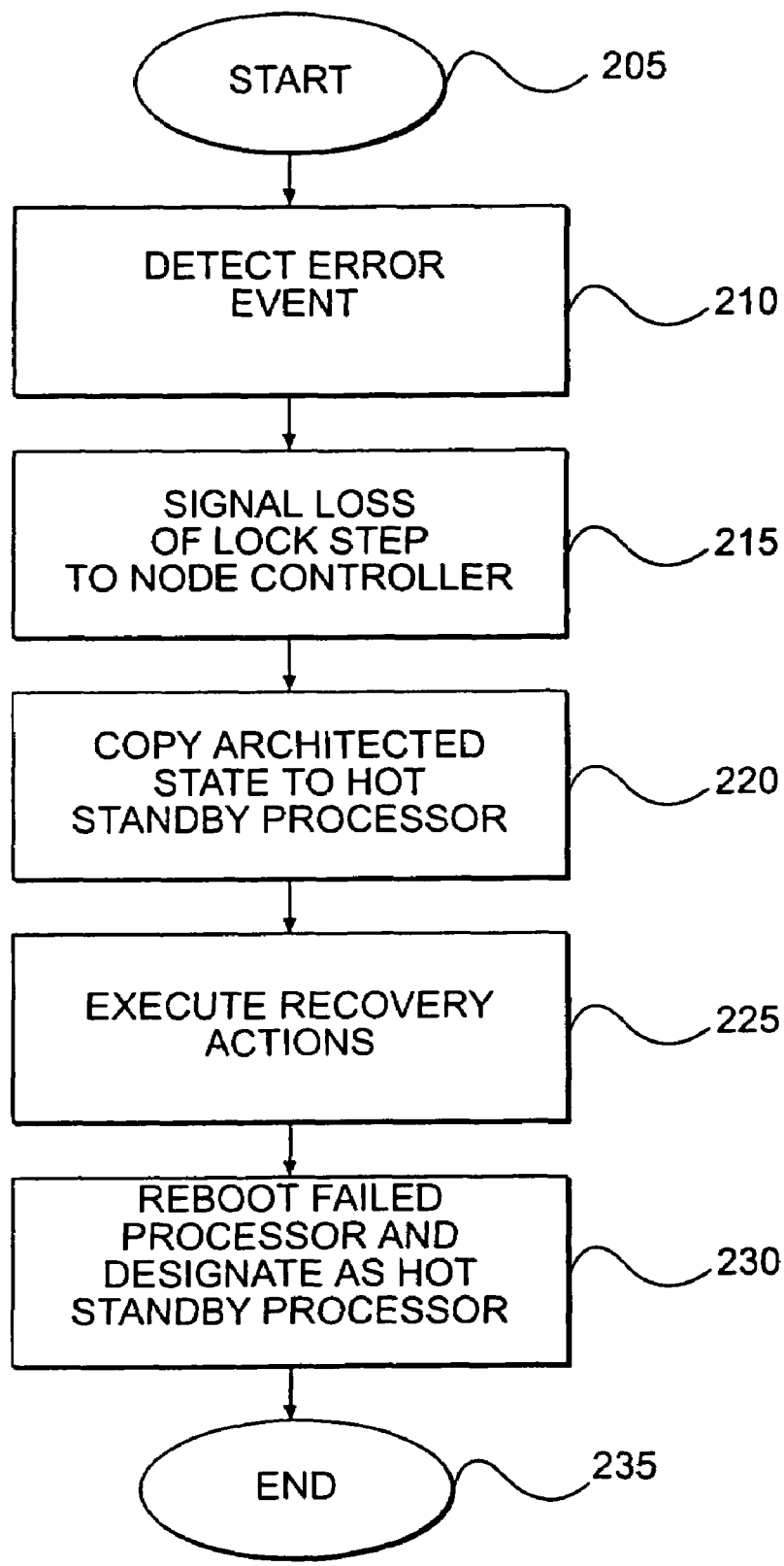
FIG. 4 is a flowchart illustrating a process for recovery from loss of lock step in the computer system of FIG. 3.

FIG. 4 is a flow chart illustrating a process 200 for recovery from a loss of lock step using the computer system 100 shown in FIG. 3. The process 200 will be shown with an error condition in the first processor pair 111/113. The operation 200 begins in block 205 with the system 100 operating in a normal lock step fashion. In block 210, the processor 111 detects an error event that indicates an impending loss of lock step. In block 215, the processor 111 signals the node controller 130 that the first processor pair 111/113 has broken lock step and that the first processor pair 111/113 should be taken "off-line." In block 220, the node controller 130 copies the architected state of the first processor pair 111/113 to the hot standby processor pair 125/127. In an embodiment, the architected state of the first processor pair 111/113 may be stored in the node controller 130, and to facilitate recovery, the node controller 130 copies the stored state to the third processor pair 125/127. Alternatively, the node controller 130 may copy the state of the first processor pair 111/113 directly from the processors 111 and 113 to the processors 125 and 127 without any intermediate storage of the architected state in the node controller 130, or other component of the computer system 100. The processor pair 125/127 then becomes the logical CPU 0 in the computer system 100, and the computer system 100 operates without a hot standby processor pair. In block 225, recovery actions are executed on the first processor pair 111/113 (e.g., all caches are flushed on the processors 111 and 113). In block 230, the node controller 130 "reboots" the processors 111 and 113, and the processors 111 and 113 become the new "hot standby" processor pair on the system 100. In block 235, the operation 200 ends, with the computer system 100 operating the processors 121, 123, 125, and 127 in lock step, and with the processors 111/113 idle and in hot standby.

The terms and descriptions used herein are set forth by way of illustration only and are not meant as limitations. Those skilled in the art will recognize that many variations are possible within the spirit and scope of the invention as defined in the following claims, and there equivalents, in which all terms are to be understood in their broadest possible sense unless otherwise indicated.

What is claimed is:

1. An apparatus for recovery from loss of lock step in a computer system, comprising:
    a plurality of processor units operating in the computer system, comprising:
        at least one logical processor, the at least one logical processor comprising two or more processor units operating in lock step; and
        a spare logical processor operating in lock step in an idle state, the spare logical processor comprising two or more spare processor units; and
    a controller coupled to at least the at least one logical processor and the spare logical processor, the controller comprising means for copying an architected state of each of the two or more processor units operating in lock step to corresponding ones of the spare processor units upon detecting an error that leads to a loss of lock step.

2. The apparatus of claim 1, wherein the copying means comprises means for storing the architected state in the controller.

3. The apparatus of claim 1, wherein the copying means comprises means for copying the architected state directly from a logical processor unit to a spare processor unit.

4. The apparatus of claim 1, wherein the copying means comprises means for:
    copying the architected state from a loss of lock step processor unit to the controller; and
    copying the architected state from the controller to a spare processor unit.

5. The apparatus of claim 1, wherein each of the at least one logical processor units comprise:
    means for detecting an event indicative of an impending loss of lock step; and
    means for signaling an occurrence of loss of lock step.

6. The apparatus of claim 1, wherein the controller resets logical processor units experiencing a loss of lock step to reestablish a spare logical processor.

7. A method for recovery from loss of lock step in a computer system, comprising:
    detecting an event signaling a loss of lock step in a processor unit; and
    copying an architected state of the loss of lock step processor unit to a spare processor unit operating idle in lock step, wherein the spare processor unit becomes an active processor unit in the computer system.

8. The method of claim 7, further comprising idling the loss of lock step processor unit.

9. The method of claim 7, further comprising correcting an error condition in the loss of lock step processor unit.

10. The method of claim 9, further comprising rebooting the loss of lock step processor unit, whereby the rebooted processor unit becomes a new spare processor unit.

11. The method of claim 7, wherein copying the architected state comprises copying the architected state from a node controller that couples the loss of lock step processor unit and the spare processor unit.

12. The method of claim 7, wherein copying the architected state comprises copying the architected state directly from the loss of lock step processor unit to the spare processor unit.

13. The method of claim 7, wherein copying the architected state comprises:
    copying the architected state from the loss of lock step processor unit to a node controller; and
    copying the architected state from the node controller to the spare processor unit.

14. An apparatus for recovery from loss of lock step in a computer system, comprising:
    means for detecting an event signaling a loss of lock step in a processor unit; and
    means for moving an architected state of the loss of lock step processor unit to a spare processor unit operating in lock step in an idle state, wherein the spare processor unit becomes an active processor unit in the computer system.

15. The apparatus of claim 14, further comprising means for idling the loss of lock step processor unit.

16. The apparatus of claim 14, further comprising means for correcting an error condition in the loss of lock step processor unit.

17. The apparatus of claim 16, further comprising means for rebooting the loss of lock step processor unit, whereby the rebooted processor unit becomes a new spare processor unit.

18. The apparatus of claim 14, wherein the moving means comprises means for copying the architected state from a node controller that couples the loss of lock step processor unit and the spare processor unit.

19. The apparatus of claim 14, wherein the moving means comprises means for copying the architected state directly from the loss of lock step processor unit to the spare processor unit.

20. The apparatus of claim 14, wherein the moving means comprises means for:
    copying the architected state from the loss of lock step processor unit to a node controller; and
    copying the architected state from the node controller to the spare processor unit.

* * * * *

UNITED STATES PATENT AND TRADEMARK OFFICE
CERTIFICATE OF CORRECTION

PATENT NO. : 7,370,232 B2 Page 1 of 1
APPLICATION NO. : 11/454087
DATED : May 6, 2008
INVENTOR(S) : Kevin David Safford It is certified that error appears in the above-identified patent and that said Letters Patent is hereby corrected as shown below:

In column 1, line 57, after "system" delete "I".

In column 3, line 19, delete "13" and insert -- 113 --, therefor.

Signed and Sealed this

Fifth Day of August, 2008

JON W. DUDAS
*Director of the United States Patent and Trademark Office*